Sept. 20, 1927.
G. M. FULLARTON
1,642,771
APPARATUS FOR ASSEMBLING PARTS
Filed Oct. 7, 1924
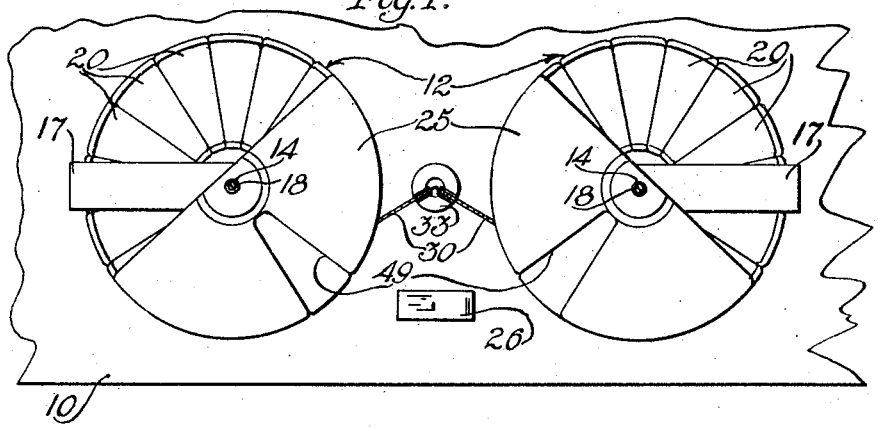
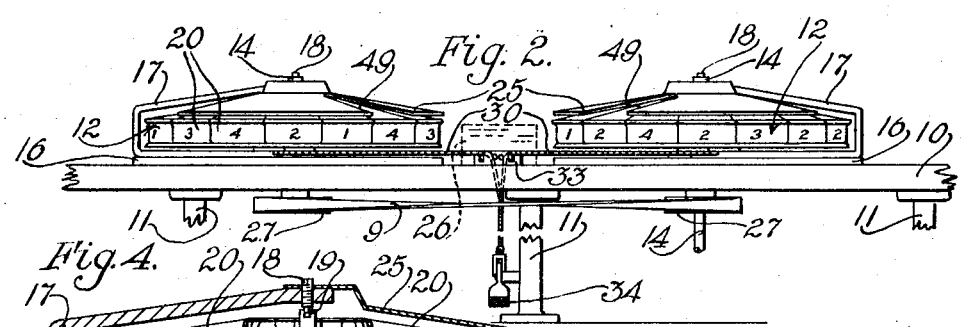
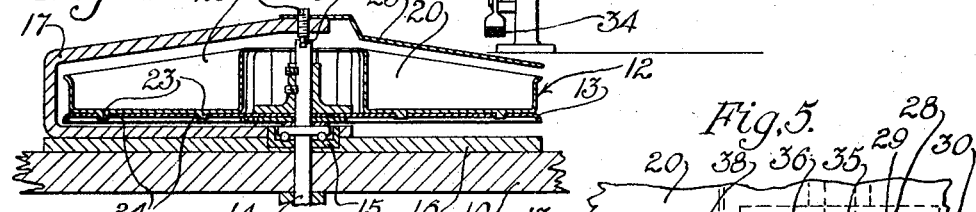
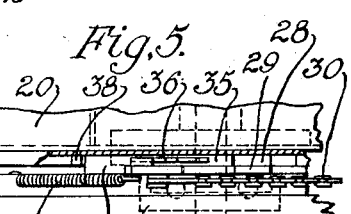
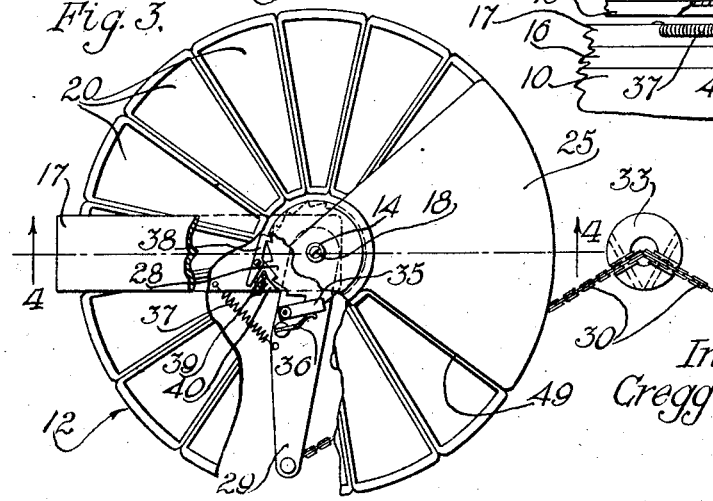
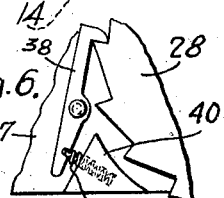
Inventor
Gregg M. Fullarton
by
Att'y.

Patented Sept. 20, 1927.

1,642,771

UNITED STATES PATENT OFFICE.

GREGG M. FULLARTON, OF CICERO, ILLINOIS, ASSIGNOR TO WESTERN ELECTRIC COMPANY, INCORPORATED, OF NEW YORK, N. Y., A CORPORATION OF NEW YORK.

APPARATUS FOR ASSEMBLING PARTS.

Application filed October 7, 1924. Serial No. 742,272.

This invention relates to an apparatus for assembling parts, and more particularly to an apparatus for presenting parts to an assembly position.

The principal object of the invention is the provision of an improved apparatus for assembling a plurality of parts efficiently and expeditiously.

In accordance with the general features of the invention there is provided an apparatus embodying the features of the invention wherein a plurality of multiple compartment trays containing parts distributed therein in their order of assembly are rotated synchronously to simultaneously present to the operator the individual compartments containing the cooperating parts required in each step of the assembly process; the trays being indexed either by or independently of the operator, and all parts within a compartment being of the same character.

Other objects and advantages of the invention will more fully appear from the following detailed description taken in connection with the accompanying drawings which illustrate one embodiment thereof and in which Fig. 1 is a fragmentary plan view of the improved assembling apparatus;

Fig. 2 is a front view of the apparatus shown in Fig. 1;

Fig. 3 is an enlarged plan view of a portion of the apparatus shown in Fig. 1;

Fig. 4 is a fragmentary sectional view taken on the line 4—4 of Fig. 3 looking in the direction indicated by the arrows, Fig. 5 is an enlarged fragmentary front view of the structure shown in Fig. 3, and Fig. 6 is an enlarged fragmentary plan view of Fig. 3 showing the ratchet mechanism in detail.

Referring now to the drawings in detail in which like reference numerals designate similar parts throughout the several views, 10 denotes a bench of any usual structure suitably supported on legs or standards 11. Positioned on the top of the bench 10 are two revolvable multiple compartment trays hereinafter referred to generally by the reference character 12.

Each of the trays 12, comprises a revolvable plate 13, secured to a shaft 14, which is suitably journaled in an anti-friction bearing element 15, mounted in the center of a wooden disk 16, secured to the bench 10. Secured to the disk 16 is a bent bar 17 which clears the plate 13 and on its end carries an adjustable threaded pin 18 which projects into a hole 19 in the end of the shaft 14, maintaining the shaft 14 at all times in a true vertical position. Mounted on the plate 13 are a number of compartment members 20 containing the parts to be assembled, such members being individually attached to and individually removable from the plate. The parts are distributed in the compartment members 20 in their order of assembly, the parts in each compartment being alike. Each of the compartment members 20 has formed on its bottom surface a plurality of lugs 23 which fit snugly in a plurality of corresponding openings 24 in the plate 13; the lugs 23 and the slots 24 serving to maintain each of the compartment members 20 in its respective position on the plate 13. Secured to the top of one end of the bent arm 17 is a cover member 25 which covers approximately half of the members 20 and serves as a guide to designate the compartment member from which the operator is to withdraw or remove parts. It is, of course, apparent that the cover member 25 is provided with an opening 49 which permits the operator to withdraw parts from only one compartment member of the covered portion of the tray. Located intermediate the trays 12 and in line with the openings 49 of the covers 25 is an assembly fixture 26 which is shown diagrammatically in Fig. 1. It is to be understood that the assembly fixture 26 may be of any suitable construction or type dependent upon the particular apparatus being assembled.

Secured to the shafts 14 are pulleys 27 which are connected by a twisted belt 9, one of the shafts 14 being driven from any suitable source of power (not shown). Keyed to each of the shafts 14 is a ratchet 28. Pivotally mounted at one end, to each of the shafts 14 is a lever 29, the other end thereof being attached to a chain 30. The chains 30 pass through a central guide member 33, mounted in the bench 10, and are terminated in a stirrup 34 (Fig. 2) suitably supported by one of the legs 11. Pivotally secured to each of the levers 29 (Fig. 3) is a pawl 35 which is maintained in engagement with the teeth of the ratchet 28 by a spring 36, secured to the lever 29.

Attached to the bar 17 at one end and to the lever 29 at the other is a spring 37 which maintains the lever 29 in its normal position. Pivoted to the bar 17 is a pawl 38 one end of which engages a tooth of the ratchet 28. Secured at one end to the other end of the pawl 38 is a spring 39, the other end of which is secured to a block 40 which is integral with the bar 17.

The operation of this mechanism is as follows: The operator first fills the compartment members 20 of the trays 12 with parts; all of the parts in each compartment member 20 being of one kind. It is, of course, understood that the members 20 are individually removable from the plate 13 so as to permit their being filled before being placed on the plate and are arranged therein in a predetermined order. The parts are distributed in the compartment members 20, as previously stated, in their order of assembly.

The trays are then turned until the compartment members 20 containing the first parts to be assembled are in line with the assembly fixture 26, and immediately below the openings 49 of the cover members 25. It will be noted that the cover members 25 perform two functions, one for indicating the compartments from which the operator is to withdraw the parts, and the other for covering a certain number of the compartment members 20 to thereby eliminate the chances of the operator withdrawing the wrong parts and from omitting to withdraw certain parts.

The trays 12 are disclosed herein as being capable of being indexed manually or turned continuously and automatically. The operator removes the first parts from the compartment members 20 immediately below the openings 49 in the guide or cover members 25, and places them in the assembly fixture 26. Then by stepping on the stirrup 34 the operator through chains 30, levers 29, and pawls 35 causes the ratchets 28 each to be indexed one tooth. The ratchet 28 contains the same number of teeth as there are compartment members 20 and by indexing it one tooth the next compartment member 20, in each of the trays 12, is presented to the operator, enabling the operator to remove parts therefrom and to place and assemble them in the fixture 26. This operation is continued until all of the parts have been assembled in the fixture 26, at which time the assembled product is removed therefrom and the process repeated.

Whenever it is necessary or desirable that the trays 12 be indexed at a relatively slow rate of speed in order to enable the operator to assemble the parts in the fixture 26, or where the time required to assemble the successive parts varies considerably, the above described manually operated indexing mechanism may be used. However, whenever the assembly operation is such that the trays can be turned at a relatively greater speed the above mentioned manually controlled mechanism need not be employed and the pulleys 27 may be actuated by one of the shafts 14 driven from any suitable source of power (not shown). It is to be understood that the trays are turned or indexed synchronously, and that each time a compartment member 20 is presented to the operator, the operator is notified by the clicking of the pawl 38 as it rides over the teeth of the ratchet. When operated in this manner the lengths of the assembly steps are limited by the movement of the trays and may be adjusted to provide a uniform efficiency of assembly for all operators. Furthermore, the number of compartment members 20 may be varied in accordance with the number of parts to be assembled in the fixture 26, and it is to be understood that the present invention is to be limited only in so far as defined by the appended claims. As shown in Fig. 2 the end of each compartment member 20 bears a number which indicates to the operator the number of parts to be withdrawn therefrom each time it is presented to the operator.

This invention has many advantages, one of the most important of which is that it provides an efficient method of assembling parts whereby the training of a new and inexperienced operator will be facilitated, inasmuch as the operator will be enabled to assemble the parts into a unit or assembly without the necessity of first being taught the order in which the parts are to be assembled.

What is claimed is:

1. In an apparatus for assembling parts, an assembly element, a multiple compartment tray for containing parts, means for causing a relative movement between the tray and the assembly element to selectively cause one of the compartments to occupy a predetermined relation to the assembly element, and means to prevent access to another of the compartments.

2. In an apparatus for assembling parts, a pair of revolvable trays having a plurality of individually removable compartments for containing parts, an assembly element positioned intermediate the trays in which the parts are assembled, and means including individual ratchet mechanism connected with a common operating member for synchronously rotating the trays to simultaneously present to the element the individual compartment in each tray containing the parts required in each step of the assembly process.

3. In an apparatus for assembling parts, means for holding a plurality of parts, an assembly element, means for causing a relative movement between the holding means and the assembly element to present the parts to the element in a predetermined order, and means for indicating when each part is presented.

4. In an apparatus for assembling parts, an assembly element, a multiple compartment tray for containing parts, means for causing a relative movement between the tray and the assembly element to selectively cause one of the compartments to occupy a predetermined relation to the assembly element, and a cover for the compartments preventing access to a plurality of compartments simultaneously.

5. In an apparatus for assembling parts, an assembly element, a multiple compartment tray for containing parts, each compartment designated to denote the number of parts to be withdrawn therefrom, and means for causing a relative movement between the tray and the assembly element to selectively cause one of the compartments to occupy a predetermined relation to the assembly element for the transfer of parts from the compartment to the element.

6. In an apparatus for assembling parts, an assembly element, a multiple compartment tray for containing parts, means for causing a relative movement between the tray and the assembly element to selectively cause one of the compartments to occupy a predetermined relation to the assembly element, and a cover for the tray designed to permit access to the selected compartment and extending on either side thereof to prevent access to the adjoining compartments.

7. In an apparatus for assembling parts, a circular revolvable tray, a plurality of individually removable compartments designed to be carried by the tray and containing parts to be assembled, an assembly element, means for revolving the tray to present one of the compartments to the assembly element, and a cover for the tray designed to permit access to the presented compartment and extending on either side thereof to prevent access to the adjoining compartments and designed to permit the removal of the compartments from a restricted portion of the tray.

In witness whereof, I hereunto subscribe my name this 24th day of September A. D., 1924.

GREGG M. FULLARTON.